United States Patent
Erickson

[15] 3,667,172
[45] June 6, 1972

[54] VEHICLE HUT

[72] Inventor: Aliver M. Erickson, P. O. Box 363, Elk River, Minn. 55330

[22] Filed: June 24, 1970

[21] Appl. No.: 49,223

[52] U.S. Cl. .................................. 52/64, 52/143, 52/174, 52/204
[51] Int. Cl. ............................................... E04h 1/12
[58] Field of Search .................... 52/64, 69, 174, 143, 204

[56] References Cited

UNITED STATES PATENTS

| 195,285 | 9/1877 | Hoyt | 52/69 |
|---|---|---|---|
| 2,712,677 | 7/1955 | Hyde | 52/69 |
| 3,442,057 | 5/1969 | Derr | 52/142 |

FOREIGN PATENTS OR APPLICATIONS

| 44,164 | 11/1934 | France | 52/64 |
|---|---|---|---|
| 238,101 | 6/1945 | Switzerland | 52/174 |

*Primary Examiner*—John E. Murtagh
*Attorney*—Frederick E. Lange, William C. Babcock and Eugene L. Johnson

[57] ABSTRACT

A hut for housing a snowmobile or similarly sized vehicle having a pair of bottomly hinged doors for permitting the snowmobile to enter and exit while traveling in a forward direction. The doors are each provided with a pair of guides for reinforcement and for directing the snowmobile.

9 Claims, 3 Drawing Figures

INVENTOR.
ALIVER M. ERICKSON
ATTORNEY

INVENTOR.
ALIVER M. ERICKSON
BY
ATTORNEY 3,667,172

VEHICLE HUT

BACKGROUND OF THE INVENTION

This invention relates generally to a garage construction for the storage of vehicles and more particularly to a garage construction suitable for housing a snowmobile or similarly sized vehicle.

With the advent of the snowmobile and with its increasing popularity in recent years, the problem of housing snowmobiles and protecting them from the elements has grown. The efficient housing of any vehicle, whether it be a car, boat, plane or snowmobile requires several considerations. First of all, the hut should be large enough to adequately house the vehicle but small enough to minimize construction costs; secondly, the hut should provide for easy passage into and out of the hut by the vehicle; and thirdly, the hut should be capable of being easily moved since their location is often temporary.

In addition, the design of a suitable hut for a snowmobile presents several problems which are not present in huts for vehicles other than snowmobiles and which have not been solved by conventional snowmobile huts. Almost without exception, snowmobiles are driven by a centrifrical clutch assembly which allows for the snowmobile to be driven in a forward direction only. Consequently, any movement of the vehicle in a reverse direction must be by an external force. Usually this external force is the manual labor of the operator. The conventional snowmobile huts of the past contained only a single door which permitted the operator to drive the snowmobile into the hut in a forward direction. However, to remove the vehicle from the hut, the operator had to manually drag the vehicle from the hut in a reverse direction. Even then, the operator had to manually turn the snowmobile away from the hut before starting the engine and driving the vehicle away.

Also since snowmobiles are operated almost exclusively during the winter months, snow removal around the storage hut is often a problem. In the conventional snowmobile huts of the past, the sidehinged door of the hut could not be opened until most of the snow near the door had been removed. This was time consuming and often reduced the pleasure of snowmobiling.

SUMMARY OF THE INVENTION

In contrast to the snowmobile huts which have existed in the past, the present invention has confronted the problems which have beset vehicle hut design generally, and more particularly, has solved many of the problems now existing in the design of snowmobile storage huts. The snowmobile hut of the present invention is only slightly larger than the snowmobile itself yet allows for the snowmobile to easily enter and exit the hut while traveling only in a forward direction. This is accomplished by the positioning and operation of a pair of doors for the hut which can be selectively and separately opened and closed. Also, the pair of doors functions to guide the snowmobile into and out of the hut, when such is desired. The particular operation of the doors also permits the snowmobile to easily enter and exit the hut without the need for extensive snow removal.

Accordingly, it is an object of the present invention to provide an improved snowmobile hut having a size suitable for housing a snowmobile whereby the snowmobile may enter and exit while moving in a forward direction only.

It is also an object of the present invention to provide an improved snowmobile hut having a pair of doors at opposite ends of the hut which can be selectively and separately opened for the entrance and exit of the snowmobile in a forward direction only.

It is also an object of the present invention to provide an improved snowmobile hut whereby the doors to the hut can be used as ramps to guide the snowmobile into and out of the hut.

A further object of the present invention is to provide an improved snowmobile hut which can easily be moved to various locations.

These and other objects of the present invention will become apparent upon reference to the following drawings and specification and to the appended claims.

DESCRIPTION OF THE PREFERRED EMBODIMENT

Figure 1:
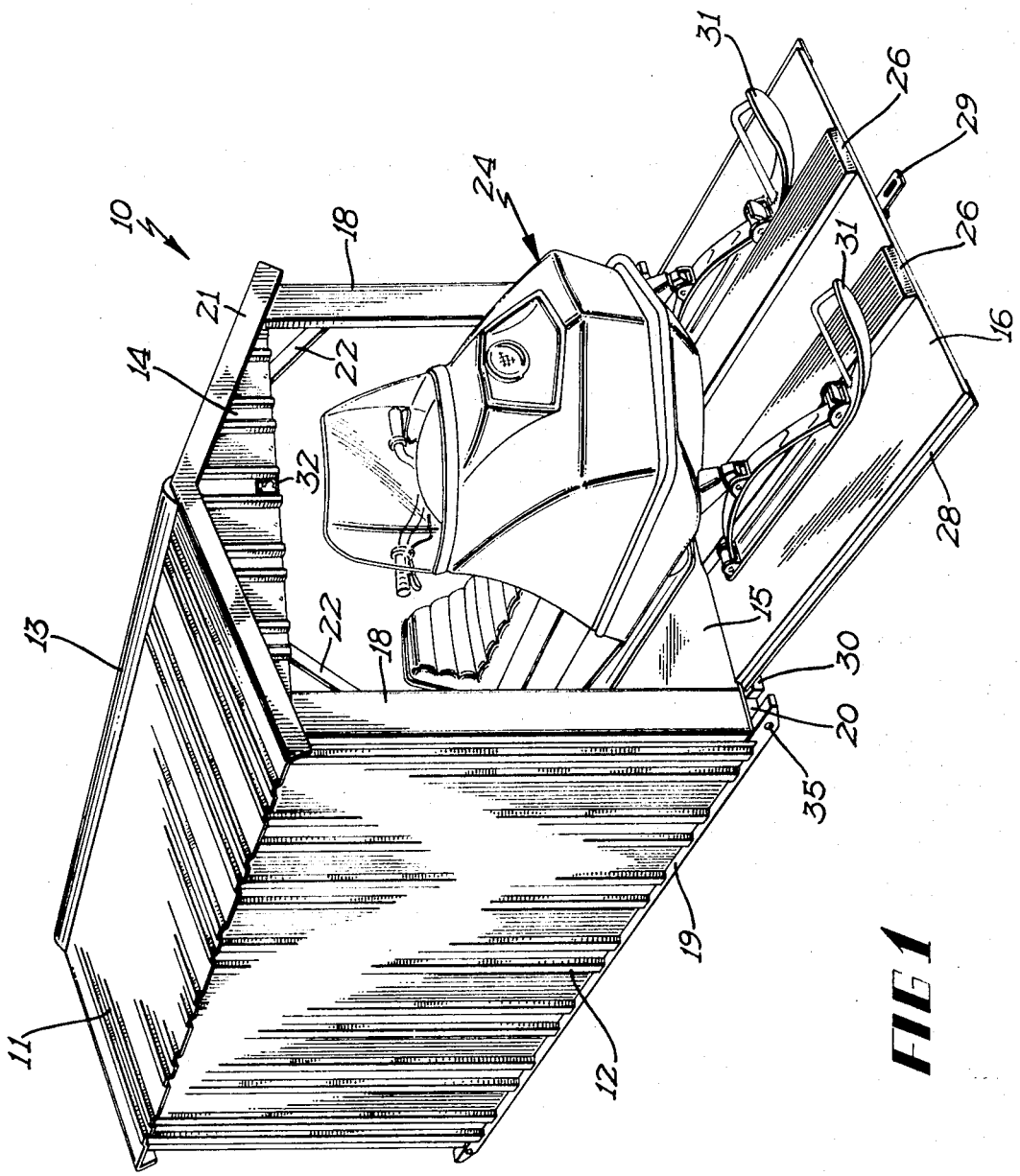
FIG. 1 is a perspective view of the snowmobile hut showing one of the doors open and serving as a ramp for the exiting snowmobile.

Referring first to FIG. 1, the snowmobile hut 10 of the present invention includes a housing construction having a suitable roof 11, a pair of side walls 12, a pair of end walls 14 each containing an opening, a pair of downwardly hinged doors 16 at each end of the hut conforming substantially in size and shape to the opening in the end walls 14, and a floor 15 which combine to form the basic vehicle hut. The entire vehicle hut 10 is in turn mounted on a base (FIG. 3) which comprises generally a pair of outer skids 19, a center skid 34 and a number of crosspieces 20. In addition, a pair of end studs 18 located at each end of the hut 10 form a portion of each end, and serve as stops for each of the downwardly hinged doors 16. In effect, the two pair of end studs 18 comprise the four corners of the hut, and support the end walls 14, the side walls 12 and the roof 11.

Each pair of end studs 18 can be constructed from any one of a number of materials. In the present embodiment however, the end studs 18 are made from 2 × 6 inches wooden planks which are secured to the floor 15 and extend upward therefrom to the roof 11 where they meet and support the end wall 14. In the preferred structure, a sheet of corrugated aluminum or other suitable building material is secured at its bottom to one of the outer skids 19, at its top to a top beam (not shown), and at each of its sides to corresponding end studs 18 of each pair to define one side wall 12. The top beam (not shown) extends from the top of one of the end studs to the top of its corresponding end stud at the other end. The flat portion of each of the end studs 18 faces the end of the hut 10 to partially define each end.

Each end wall 14 is secured to the tops of one of the pairs of end studs 18 by the braces 22. Each end wall 14 generally forms an isosceles triangle with the base of the triangle defining the top of the doorway, and the two sides of the triangle defining the sloping edge of the roof 11. Each end wall 14, like the side walls 12, is preferably composed of sheet aluminum or other suitable building material. The roof 11, also preferably made of sheet aluminum, is formed by securing the sheet aluminum to a roof frame defined generally by the pair of top beams (not shown) extending between the corresponding end studs 18, a center beam (not shown) extending between the uppermost portions of each of the end walls 14, and the sloping sides of the end walls 14. A number of corner brackets 21 are secured to each end of the roof 11 and a ridge cap 13 is secured to the top edge of the roof in order to improve the external appearance of the hut and to further protect the snowmobile from the elements. The brackets 21 and the cap 13 also serve to connect the roof 11 with each of the end walls 14.

Figure 2:
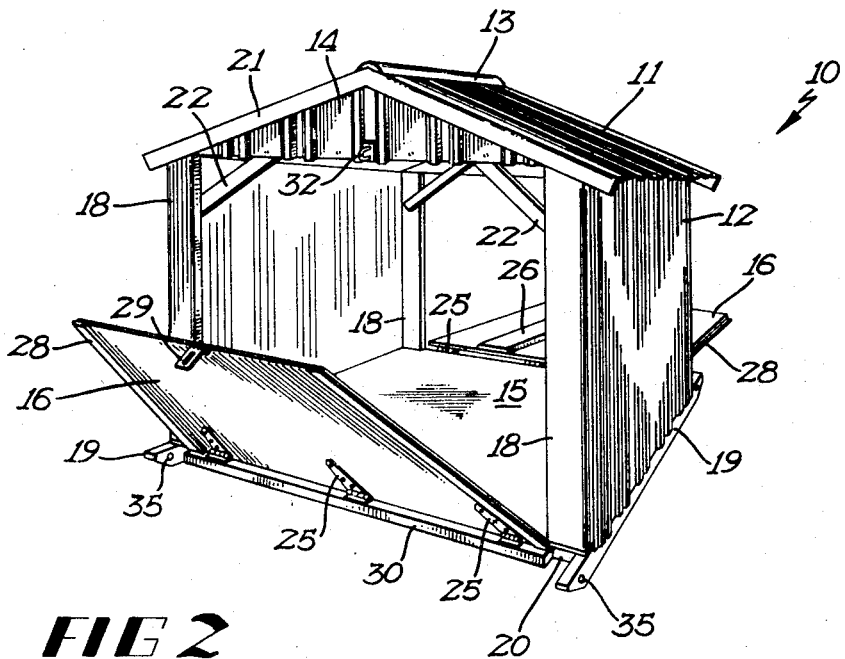
FIG. 2 is a perspective view looking through the snowmobile hut with one of the doors open and serving as a ramp and the other partially closed.

A door 16 is provided at each end of the hut 10 to permit the snowmobile to be driven into and out of the hut. In FIG. 1, one of the doors is shown in an open position with the snowmobile being driven out of the hut. Each of the doors 16 is downwardly hinged, and extends over a substantial portion of each end of the hut 10. As best shown in FIG. 2, the doors 16 are hinged to the crosspiece 20 by a number of tee hinges 25. The strap portion of the tee hinges 25, as shown in FIG. 2, is fixedly secured to the door 16 while the butt portion (not shown) of the tee hinges 25 is secured to the end crosspiece 20 to allow for each of the doors to be pivoted downwardly about the end crosspiece 20. A support member 30 is also secured to the end crosspiece 20 covering the butt portion of the tee hinges 25, and serving primarily as a support for the door 16 when it is open to thereby relieve some of the force acting on the butt portion of the hinges 25.

A pair of guides 26, best seen in FIG. 1, are bolted to the inside of each door 16 to direct and guide the snowmobile 24 into and out of the hut 10. The guides 26 are parallel to each other, and are spaced so that the distance between the outer edges of each pair of planks conform substantially to the distance between the inner edges of the ski portions 31 of the snowmobile 24. In this manner, the snowmobile 24 is properly oriented for passage into and out of the hut.

Also, as shown in FIG. 1, the door in its open position is conveniently used as a ramp for the snowmobile 24. Because of this, the operator does not have to worry about negotiating the height difference between the ground and the floor of the hut in conventional snowmobile huts having side hinged doors, but rather has to worry only about properly aligning the snowmobile for entrance into the hut. The downwardly hinged doors 16 when functioning as a ramp, also allow for the snowmobile to be easily driven into or out of the hut 10 even when there is several feet of snow on the ground. This is possible since the snowmobile may enter or exit the hut when the doors are only partially open, as is the case when the doors are resting on several feet of snow. Because of this, the openings in each of the end walls 14 must be sufficiently large that a snowmobile may be driven into and out of the hut when the doors are only partially open. In addition to serving as guides for the snowmobile 24, the guides 26 also serve to reinforce the door 16 when it is used as a ramp. In the present invention the guides 26 are made of 1 × 6 inches wooden planks.

A pair of metal plates 28 are secured to the outer edges of the door 16, each of the plates 28 having a portion extending over the outer surface of the door 16 and a portion extending past the outer edge of the door for a limited distance to serve as a stop when the door is closed. When serving as a stop, the portion of the metal plates 28 extending past the edge of the door 16 contact the end studs 18 to limit the inward movement of the door 16.

Latch means, shown in the preferred embodiment as a hasp 29 secured to the top of each of the doors 16 for association with a hook 32 is secured to the end wall 14. The hasp 29 in combination with the hook 32 serves to hold the door 16 in a closed position, and when locked, to prevent the entrance of unwanted intruders.

As seen in FIG. 2, a bottom hinged door 16 is located at each end of the hut 10 to permit easy entry and exit of the snowmobile. This construction is necessary since snowmobiles are driven by centrifical clutch assemblies which permit movement in a forward direction only. With a door at each end, the snowmobile can be driven in one end and out the other while traveling in a forward direction only.

Figure 3:
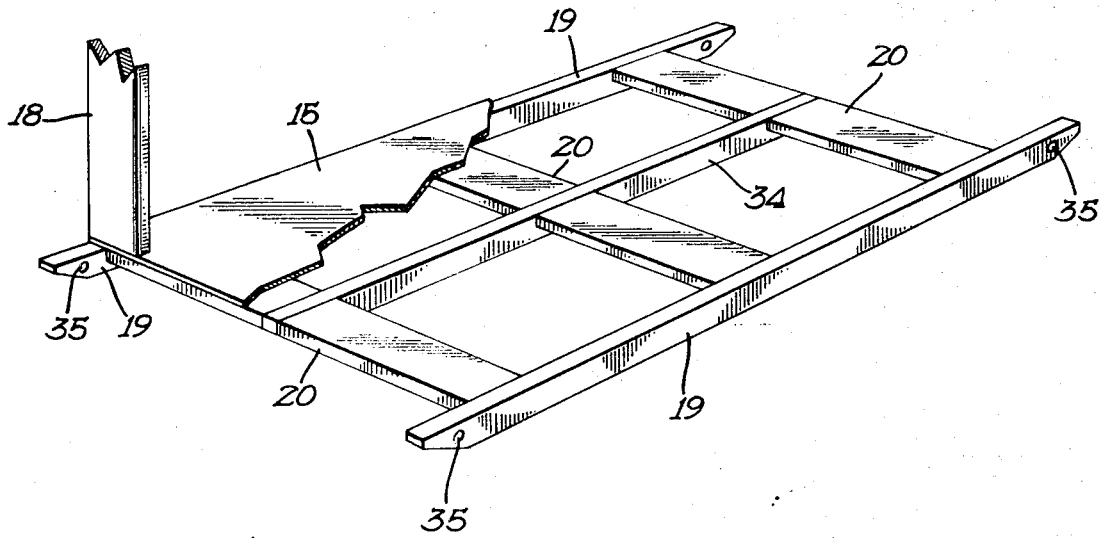
FIG. 3 is a view of the base or skid portion of the snowmobile hut with the upper portion cut away.

Referring now to FIG. 3, the base or skid portion of the hut 10 is clearly seen as including outer skids 19, center skid 34 and crosspieces 20. Skids 19 and 34 are held in spaced relationship by crosspieces 20. In the present invention, skids 19 and 34 are wooden 2 × 4's with their edge portions in contact with the ground while the crosspieces 20 are wooden 2 × 4's lying flat with respect to the skids 19 and 34. As seen, the ends of the skids are slightly tapered to allow the hut 10 to be skidded easily. Also, located at the end of each of the outer skids 19 is a hole 35 whereby extension from a towing vehicle (not shown) may be connected to tow the hut 10 to various locations. Also partially shown in FIG. 3 is one of the end studs 18 and a portion of the floor 15 and their relationship to the skid or base portion of the hut.

With the foregoing construction and arrangement, a snowmobile is driven up to the hut 10 and one of the doors 16 is swung down to serve as a ramp. The snowmobile is then driven in a forward direction up the ramp and into the hut 10. After the operator has dismounted the vehicle and left the hut, the open door 16 is closed. When the snowmobile is to be used again, the door 16 at the other end is opened and swung down thereby serving as a ramp for the exit of the snowmobile in a forward direction as shown in FIG. 1.

This invention may be embodied in other forms not specifically shown in the preferred embodiment without departing from the spirit or essential characteristics thereof. The preferred embodiment is therefore to be considered illustrative only, with the scope of the invention being indicated by the appended claims and their equivalents.

What is claimed and desired to be secured by the United States Letters Patent is:

1. An improved snowmobile hut for housing a ski supported snowmobile and protecting said snowmobile from the elements comprising:
    a base;
    a floor secured to said base for supporting the snowmobile when said snowmobile is inside said hut;
    a pair of sidewalls extending upwardly from said floor;
    a pair of end walls extending upwardly from said floor and secured to the ends of said side walls, each of said end walls containing an opening;
    a roof connected to the top edge of said side and end walls;
    a pair of bottomly hinged doors positioned at opposed ends of said enclosed structure, each of said doors conforming in size and shape to said opening and being hinged at the bottom enabling each of said doors to serve as ramps for supporting and guiding said snowmobile during its entry and exit, said openings being sufficiently large that a snowmobile may be driven into and out of said hut when said doors are partially open;
    stop means associated with each of said doors for limiting the upward and inward movement of said doors; and
    latch means for securing each of said doors in a closed position.

2. The improved snowmobile hut of claim 1 wherein said base includes skid means for moving the hut from one location to another.

3. The improved snowmobile hut of claim 1 wherein said stop means includes a bracket secured to at least one edge of each of said doors, said bracket having a portion extending over the outer side of each of said doors and a portion extending past the edge of each of said doors for contact with a portion of said enclosed structure.

4. The improved snowmobile hut of claim 1 and a pair of corresponding guides secured to the inner side of each of said doors for guiding the snowmobile into the hut and for reinforcing said doors.

5. The improved snowmobile hut of claim 4 wherein said stop means includes a bracket secured to at least one edge of each of said doors, said bracket having a portion extending over the outer side of each of said doors and a portion extending past the edge of each of said doors for contact with a portion of said enclosed structure.

6. The improved snowmobile hut of claim 4 wherein each guide of said pair of corresponding guides includes a plank secured to said door, each guide being secured in parallel relationship to its corresponding guide of said pair of guides, said corresponding guides being spaced so that the distance between the outer edges of said corresponding guides is substantially equal to the distance between the inner edges of the snowmobile skis.

7. The improved snowmobile hut of claim 6 wherein said base includes skid means for moving the hut from one location to another.

8. The improved snowmobile hut of claim 6 wherein said stop means includes a bracket secured to at least one edge of each of said doors, said bracket having a portion extending over the outer side of each of said doors and a portion extending past the edge of each of said doors for contact with a portion of said enclosed structure.

9. The improved snowmobile hut of claim 8 wherein said base includes skid means for moving the hut from one location to another.

* * * * *